US012595054B2

(12) United States Patent
Obermoser

(10) Patent No.: US 12,595,054 B2
(45) Date of Patent: Apr. 7, 2026

(54) ENGINE FOR A FLYING BODY, METHOD FOR OPERATING AN ENGINE FOR A FLYING BODY, AND FLYING BODY HAVING AT LEAST ONE ENGINE

(71) Applicant: KMTC Vortifer Technologies GmbH, Fellbach (DE)

(72) Inventor: Karl Obermoser, Deining (DE)

(73) Assignee: KMTC VORTIFER Technologies GmBH, Fellbach (DE)

( * ) Notice: Subject to any disclaimer, the term of this patent is extended or adjusted under 35 U.S.C. 154(b) by 478 days.

(21) Appl. No.: 18/017,579

(22) PCT Filed: Jul. 24, 2020

(86) PCT No.: PCT/EP2020/071020
§ 371 (c)(1),
(2) Date: Jan. 23, 2023

(87) PCT Pub. No.: WO2022/017629
PCT Pub. Date: Jan. 27, 2022

(65) Prior Publication Data
US 2023/0348078 A1    Nov. 2, 2023

(51) Int. Cl.
*B64C 39/06* (2006.01)
*B60V 1/10* (2006.01)
*B64D 33/02* (2006.01)

(52) U.S. Cl.
CPC .............. *B64C 39/064* (2013.01); *B60V 1/10* (2013.01); *B64D 33/02* (2013.01)

(58) Field of Classification Search
CPC ............ B60V 1/02; B60V 1/10; B64C 39/064
See application file for complete search history.

(56) References Cited

U.S. PATENT DOCUMENTS 3,203,498 A    8/1965   Cockerell
3,215,218 A    11/1965  Hurst
(Continued)

OTHER PUBLICATIONS

International Preliminary Report on Patentability for PCT/EP2020/071020 dated Feb. 2, 2023, 10 pages.
(Continued)

*Primary Examiner* — Valentin Neacsu
*Assistant Examiner* — Hosam Shabara
(74) *Attorney, Agent, or Firm* — Sheppard Mullin Richter & Hampton LLP

(57) ABSTRACT

The invention relates to an engine (2) for a flying body (1), with an annular vortex guide element (3) which, seen in section, has an air inlet opening (6) arranged centrally with respect to a longitudinal central axis (4) of the engine (2) and, at a distance from the air inlet opening (6), an air outlet opening (7) arranged centrally with respect to the longitudinal central axis (4), which are connected to one another in terms of flow via an intake duct (5) bounded by the vortex guide element (3) and accommodating an air conveying device (8), wherein the air outlet opening (7) is overlapped by an air deflecting element (9) which is arranged geodetically above the vortex guide element (3) during intended operation of the engine (2) and which extends radially outwards from the air outlet opening (7) so that it delimits with the vortex guide element (3) an air exit gap (11) which is in flow connection with the air outlet opening (7). It is provided that the vortex guide element (3) is in the form of a body of rotation which is formed by rotation about an axis of rotation of a closed curve having a continuous course at least on its radially outer side, and in that the air inlet opening (6) opens directly into an outer environment (19) of the engine (2), so that during intended operation of the engine (2) air is conveyed from the side of the engine (2) facing away from the air deflecting element (9) through the
(Continued)

air inlet opening (6) into the intake duct (5). The invention further relates to a method for operating an engine (2) for a flying body (1) as well as a flying body (1) with at least one engine (2).

14 Claims, 1 Drawing Sheet

(56) References Cited

U.S. PATENT DOCUMENTS

| | | | |
|---|---|---|---|
| 3,397,853 A | 8/1968 | Richardson, Sr. | |
| 5,203,521 A | 4/1993 | Day | |
| 7,201,346 B2 * | 4/2007 | Hansen | B64C 39/064 |
| | | | 244/12.1 |
| 8,256,705 B2 * | 9/2012 | Smith | B64U 10/13 |
| | | | 244/12.1 |
| 11,851,182 B2 * | 12/2023 | Obermoser | B64U 30/30 |
| 2005/0205715 A1 | 9/2005 | Hansen | |

OTHER PUBLICATIONS

International Search Report and Written Opinion for PCT/EP2020/071020 dated Mar. 29, 2021, 14 pages.

* cited by examiner

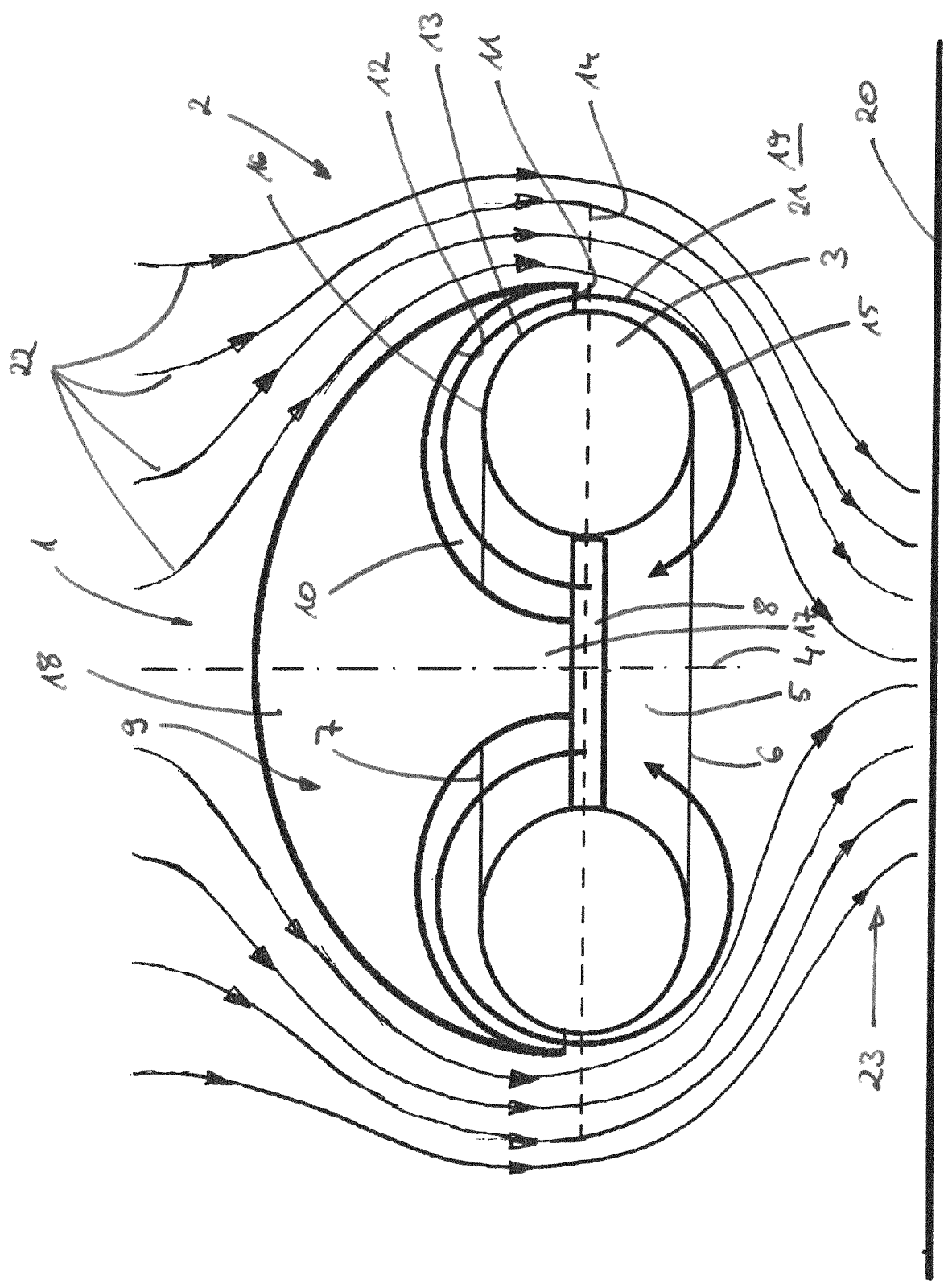

ENGINE FOR A FLYING BODY, METHOD FOR OPERATING AN ENGINE FOR A FLYING BODY, AND FLYING BODY HAVING AT LEAST ONE ENGINE

CROSS REFERENCE TO RELATED APPLICATIONS

This application is a U.S. National Stage Application under 35 U.S.C. 371 of International Application No. PCT/EP2021/071020, filed Jul. 24, 2020. The contents of which are hereby incorporated by reference in their entirety into the present disclosure.

The invention relates to an engine for a flying body, with an annular vortex guide element which, seen in section, has an air inlet opening arranged centrally with respect to a longitudinal central axis of the engine and, at a distance from the air inlet opening, an air outlet opening arranged centrally with respect to the longitudinal central axis, which are connected to one another in terms of flow via an intake duct bounded by the vortex guide element and accommodating an air conveying device, wherein the air outlet opening is overlapped by an air deflecting element which is arranged geodetically above the vortex guide element during intended operation of the engine and which extends radially outwards from the air outlet opening so that it defines with the vortex guide element an air exit gap which is in flow connection with the air outlet opening. The invention further relates to a method for operating an engine for a flying body and to a flying body with at least one engine.

For example, DE 20 2018 104 722 U1 is known from the prior art. This describes an aircraft with a frame structure and several lifting rotors arranged on the frame structure, by means of which a vertically upwardly directed primary lift and propulsion forces can be generated. It is provided that, in addition, a jet turbine is provided, the thrust jet of which can be directed in such a way that a secondary lift directed substantially parallel to the primary lift can be generated, which can be superimposed on the primary lift.

Further, U.S. Pat. No. 5,203,521 shows an aircraft with an annular body defining a central passage, with an upper deflector, with a lower collector and with a fluid drive in the passage. Air is accelerated by means of a drive and circulated around the annular body. The collector splits the circulating air and directs some of the air into the passage and some of the air under the aircraft to provide thrust. Other aircraft are known from U.S. Pat. Nos. 3,747,726 and 2,997,254. U.S. Pat. No. 3,215,218 also shows a motor vehicle device for increasing traction.

It is the objective of the invention to propose an engine which has advantages over known engines, in particular is scalable to a wide extent with regard to the thrust it provides and also enables particularly efficient operation.

According to the invention, this is achieved with an engine for a flying body having the features of claim 1. In this context, it is provided that the vortex guide element is in the form of a body of rotation which is formed by rotation about an axis of rotation of a closed curve having a continuous course at least on its radially outer side, and that the air inlet opening opens directly into an outer environment of the engine so that, when the engine is operated as intended, air is conveyed from the side of the engine facing away from the air deflecting element through the air inlet opening into the intake duct.

The engine is provided and designed to propel the flying body. It can therefore also be referred to as an aircraft engine. Of course, the engine can also be separate from the flying body. The flying body driven or propelled by the engine can in principle be of any design, for example it is present as an unnamed flying body, for example as a drone, or—preferably—as an aircraft. An aircraft is a vehicle that flies within the earth's atmosphere. It represents a mobile means of transport that serves to transport people, goods or the like. The aircraft is thus provided and designed for the transport of persons and/or goods.

The flying body is preferably heavier than air and has a propulsion device or a power drive, so that the flying body as a whole can be called an aircraft. In very general terms, an aircraft is a heavier-than-air aircraft that generates the dynamic lift necessary for its flight with non-rotating lift surfaces. The aircraft, in particular the engine, can also be lighter than air overall. For this purpose, the aircraft or the engine, for example, has lift-generating means.

The flying body can of course also have another design, for example it is in the form of a motor vehicle capable of flight. Such a motor vehicle is, for example, provided and designed to be moved at least temporarily on the ground or in contact with the ground, in particular on wheels of the motor vehicle, and to fly temporarily at a distance from the ground, namely propelled by means of the engine. The engine is thus used to propel the motor vehicle at least during its flight. However, it can also be used to generate propulsion while the motor vehicle is supported on the ground by its wheels.

The essential elements of the engine are the vortex guide element and the air deflecting element. The vortex guide element and the air deflecting element work together to generate thrust which serves to propel the flying body and is directed in a specific direction. Preferably, the thrust from the engine is directed, at least at times, to provide lift to the flying body. For this purpose, the thrust is usually directed geodetically downwards, i.e. starting from the flying body in the direction of a subsoil or ground. It should be emphasised at this point that it is particularly important that the engine conveys or sucks in air from the environment from the same side of the engine on which the thrust or a thrust jet generated by the engine is subsequently present. In other words, the air is preferably sucked in from geodetically below the engine or flying body when the engine is operating as intended.

The vortex guide element is basically annular in shape and completely and continuously surrounds the longitudinal central axis of the engine in the circumferential direction. A longitudinal central axis of the vortex guide element preferably corresponds to the longitudinal central axis of the engine. For example, the vortex guide element is rotationally symmetrical with respect to an axis of symmetry. In this case, the axis of symmetry preferably coincides with the longitudinal central axis of the engine. By the aforementioned section is meant in particular a longitudinal section with respect to the longitudinal central axis of the vortex guide element or with respect to the longitudinal central axis of the engine. Preferably, the thrust provided by the engine is parallel to the longitudinal central axis of the engine and/or the longitudinal central axis of the vortex guide element. In other words, a thrust vector of the engine is parallel to one of said longitudinal central axes. This is true at least in one position of the vortex guide element and the air deflecting element relative to each other, if they are displaceable relative to each other.

The vortex guide element preferably has a continuous outer circumference as seen in section or half section. This means that—again in section, in particular in longitudinal section with respect to the longitudinal central axis of the vortex guide element—the outer circumference of the vortex guide element does not have any discontinuities or jumps, but runs uniformly. For example, the vortex guide element is oval, in particular circular or elliptical, when viewed in half-section. The half-section is to be understood as a section through a sectional plane in which only one side of a further plane perpendicular to the sectional plane is observed. For example, both the section plane and the further plane take up the longitudinal central axis of the vortex guide element. In other words, only one half of the actual section is used for the half section.

It is provided that the vortex guide element is a body of rotation. The body of rotation is to be understood as a body formed by rotation of a closed curve about an axis of rotation or FIGURE axis. The axis of rotation corresponds to the longitudinal central axis of the vortex guide element. It preferably coincides with the longitudinal central axis of the engine and/or a longitudinal central axis of the flying body. In at least one position of the vortex guide element and the air deflecting element, it may also coincide with the longitudinal central axis of the air deflecting element. The curve is here particularly preferably continuously spaced from the axis of rotation in order to form the intake duct, which is then present centrally with respect to the axis of rotation. The curve has a continuous course, at least in some areas, namely at least on its side lying on the outside in the radial direction with respect to the axis of rotation, particularly preferably continuously. This means that there is no edge, in particular no marginal edge, on an outer side of the vortex guide element lying in the radial direction, but rather that discontinuities are avoided. This results in particularly low flow losses.

For example, the continuous course of the curve in the radial direction extends inwards, in particular as seen in section or half section through the engine, over at least 10%, at least 15%, at least 20% or at least 25% of the extension of the curve in the radial direction, starting from a radially outermost point of the curve. The curve extends radially inwards on both sides of the outermost point so that a first profiled surface and a second profiled surface of the vortex guide element are formed, which bound the vortex guide element in the axial direction on opposite sides. On both sides of the outermost point, the curve runs steadily inwards in the radial direction, namely in each case over one of the said portions of the curve. Particularly preferably, the curve has two portions that lie on opposite sides of an imaginary plane that is parallel to the axis of rotation and intersects the curve.

A first of the regions is radially outward and a second of the regions is radially inward. With respect to a distance in the radial direction between the radially outermost point and a radially innermost point of the curve, the plane is, for example, at least 10%, at least 20%, at least 30%, at least 40% or at least 50% spaced from the outermost point. Particularly preferably, however, it is at least 60%, at least 70%, at least 80% or at least 90% away from it. Particularly preferred are values of at least 80% and more. In the first area, the curve runs continuously throughout. In the second range, it can also be continuous or alternatively at least partially discontinuous. Particularly preferably, the first range directly adjoins at least one discontinuity, in particular directly adjoins several discontinuities, of the curve which are present in the second range. However, it can also be provided that the curve has a region on its radially inner side with respect to the axis of rotation in which it is discontinuous. Away from this region, which can also be referred to as the discontinuity region, the curve is continuous throughout.

For example, the curve has a straight section in the discontinuity area, from which the curve starts on at least one side, forming a discontinuity point. The straight section extends, for example, between the air inlet opening and the air outlet opening and insofar limits the intake duct radially outwards. Preferably, the straight section extends from the air inlet opening to the air outlet opening.

For example, it is provided that the vortex guide element has dimensions in the half-section, seen in the axial direction, which correspond to at least 25% or at least 50% of its dimensions in the radial direction. Alternatively, the dimensions in the axial direction may be larger and correspond to at least 75% or at least 100% of the dimensions in the radial direction. The dimensions in the axial direction of a surface enclosed by the curve explained above thus correspond to at least one of the said proportions of its dimensions in the radial direction.

The vortex guide element is traversed by the intake duct, which is preferably arranged centrally in the vortex guide element, i.e. coaxially of the vortex guide element. The intake duct is particularly preferably straight throughout. The intake duct extends from the air inlet opening to the air outlet opening. The air conveying device is arranged in the intake duct and serves to convey the air through the intake duct from the direction of the air inlet opening towards air outlet opening. The air conveying device can be driven, for example, with the aid of a drive device. The drive device is, for example, in the form of an electric motor, a turbine or an internal combustion engine, or at least has one of these. The air conveying device is, for example, a propeller, which can also be referred to as an impeller due to its arrangement in the intake duct, as it is surrounded by the vortex guide element. Other designs of the air conveying device are also feasible in principle, as long as they can be used to convey the air through the intake duct.

The air inlet opening is preferably to be understood as an opening which is bounded continuously by the vortex guide element in the circumferential direction with respect to the longitudinal central axis of the vortex guide element and which lies continuously in an imaginary plane. The imaginary plane continuously intersects the vortex guide element in the circumferential direction or is at least tangentially adjacent to it. Particularly preferably, the imaginary plane lies continuously tangentially on the vortex guide element in the circumferential direction. For example, the imaginary plane is perpendicular to the longitudinal central axis of the vortex guide element. The same applies analogously to the air outlet opening. The air outlet opening is therefore also continuously bounded by the vortex guide element in the circumferential direction. Preferably, it also lies continuously in a (further) imaginary plane which continuously intersects the vortex guide element in the circumferential direction or lies tangentially against it, particularly preferably lies continuously tangentially against the vortex guide element in the circumferential direction. This imaginary plane can also be perpendicular to the longitudinal central axis of the vortex guide element.

In addition to the vortex guide element, the engine has the air deflecting element. The air deflecting element is arranged geodetically above the vortex guide element, at least partially, in particular largely or completely, when the engine or flying body is operating as intended. In other words, a side of the vortex guide element facing the air deflecting element is arranged geodetically above a side of the vortex guide element facing away from the air deflecting element. Geodetically, the vortex guide element is thus located between the air deflecting element and the ground during intended operation. A different geodetic orientation of the air deflecting element and vortex guide element can also be provided in principle. However, it is essential that the air is drawn in through the air inlet opening in a different direction than it is discharged through the air exit gap.

In particular, the axial velocity components of a respective velocity vector—with the same reference system—differ from each other with regard to their sign. Thus, if the axial velocity component of one of the velocity vectors is less than zero, the axial velocity component of another of the velocity vectors is at least equal to zero, is in particular exactly equal to zero or greater than zero, or vice versa. In principle, it is provided that the air is drawn in directly from the outer environment through the air inlet opening and discharged directly into the outer environment through the air exit gap. The air thus flows into the engine, in particular into the flying body, through the air inlet opening and out of the engine, in particular out of the flying body, through the air exit gap.

Preferably, it is provided that the air inlet opening and the air exit gap are aligned such that, when the engine is operating as intended, the air enters through the air inlet opening in a direction that is axially opposite to or perpendicular to a direction through which air exits from the air exit gap. The air from the outer environment enters the intake duct through the air inlet opening in a first direction or with a first velocity vector. It exits the air exit gap in a second direction or with a second velocity vector from the radial duct. The first direction and the second direction are, for example, perpendicular to each other or opposite to each other in the axial direction with respect to the longitudinal central axis of the engine. Thus, for example, the first velocity vector may be provided with only an axial velocity component and the second velocity vector may be provided with only a radial velocity component, whereas the respective other velocity components are equal to zero. If both the first velocity vector and the second velocity vector each have an axial velocity component, they are in opposite directions. With the same reference system, one of the velocity components is positive and the other negative.

The air deflecting element overlaps the vortex guide element at least in some areas. In this case, it is arranged on the side of the vortex guide element having the air outlet opening. Preferably, a longitudinal central axis of the air deflecting element is at least temporarily arranged parallel to the longitudinal central axis of the vortex guide element and/or the longitudinal central axis of the engine. Preferably, the longitudinal central axis of the air deflecting element corresponds to one of said longitudinal central axes, in particular in at least one position of the vortex guide element and the air deflecting element relative to each other. In other words, the air deflecting element is advantageously arranged coaxially with the vortex guide element.

The air deflecting element extends radially outwards, in particular starting from its longitudinal central axis and/or the longitudinal central axis of the engine, completely overlapping the air outlet opening in the radial direction. The air deflecting element has larger dimensions in the radial direction than the air outlet opening, so that, seen in section, the air deflecting element projects further outwards in the radial direction than the air outlet opening. The air deflecting element limits the air outlet gap away from the air outlet opening, namely in radial direction outside of the air outlet opening, together with the vortex guide element. The air outlet gap is fluidically connected to the air outlet opening via a radial duct, which is also defined by the vortex guide element and the air deflecting element. The radial duct thus extends fluidically from the air outlet opening to the air exit gap.

During operation of the engine, the air exiting the intake duct through the air outlet opening is deflected radially outwards by the air deflecting element so that it flows towards the air exit gap and subsequently enters the outer environment of the engine from the latter. The air exit gap is located, for example, on the same side of an imaginary plane as the air inlet opening, whereas the air outlet opening is located on a side of the imaginary plane opposite to this side. The imaginary plane is, for example, perpendicular to the longitudinal central axis of the vortex guide element.

The air exiting the air exit gap continues to flow along the vortex element and subsequently contributes to the generation of the thrust of the engine. For example, during intended operation of the engine, the air deflecting element is geodetically positioned above the vortex guide element. In other words, the vortex guide element is said to be between the air deflecting element and the ground. This in turn means that the engine sucks in air from geodetically below the engine or flying body, i.e. ultimately—geodetically—sucks in air from the outer environment from the underside of the engine or flying body and initially conveys it towards the top of the engine. Subsequently, the air is at least partially returned to the underside in order to generate thrust there.

The air inlet opening is located on the side of the vortex guide element facing away from the air deflecting element. To ensure effective provision of thrust, it opens directly into the outer environment of the engine. This means that no further element of the engine and/or the flying body is arranged between the air inlet opening and the outer environment. Rather, an imaginary extension of the intake duct on the side of the air inlet opening into the outer environment is designed to be free of obstructions. Thus, no further element of the engine and/or the flying body is arranged in the imaginary extension. As a result, during intended operation of the engine, air is conveyed from the side of the engine facing away from the air deflecting element through the air inlet opening into the intake duct.

This means that during the intended operation of the engine, air is drawn in from the outer environment in the direction opposite to the thrust vector of the engine. Thus, while the engine is providing thrust with the thrust vector, it is drawing in the air used to provide thrust in the opposite direction, directly from the outer environment. It has already been pointed out above that the air inlet opening opens directly into the outer environment of the engine, so that the air is also sucked in directly from the outer environment. In other words, the air inlet opening is designed without a cover, so that there is a free air space in the outer environment of the engine below the air inlet opening. The free air space is understood to be an air space which is completely filled with air and in which no further element of the engine and/or the flying body is present.

The free air space extends below the air inlet opening, in particular it extends directly from the air inlet opening. For example, the free air space is present as an imaginary extension of the intake duct, namely starting from the air inlet opening. In this respect, it is provided, for example, that the air space has an extension in the axial direction with respect to the longitudinal central axis of the engine corresponding to at least one extension of the vortex guide element and/or an extension of the air deflecting element in the same direction. The air space thus has specific dimensions, namely at least in the axial direction. This means that starting from the air inlet opening over at least said extension, no further element of the engine and/or the flying body is present on the side of the vortex guide element comprising the air inlet opening.

Preferably, the extension of the air space is greater by a factor of at least 2, at least 3, at least 4 or at least 5 than the extension of the vortex guide element, than the extension of the air deflecting element or a common extension of the vortex guide element and the air deflecting element in the same direction. Of course, these considerations only apply during flight operation of the engine or flying body. If the flying body is close to the ground, the free airspace may be limited by the ground. In this case, however, there is also no further element of the engine and/or the flying body between the air inlet opening and the ground.

Additionally or alternatively, it may be provided that an air space bounded in axial direction with respect to the longitudinal central axis of the engine on the one hand by the air inlet opening and on the other hand by the air conveying device and in radial direction outwards by the vortex guide element is completely filled with air. This air space, which is part of the intake duct and to this extent is bounded by the vortex guide element, is also designed as a free air space. Thus, no further element of the engine and/or the flying body is arranged in it, so that it is completely filled with air. The air space extends in axial direction from the air inlet opening to the air conveying device. In radial direction outwards it is bounded by the vortex guide element.

These embodiments make it clear that the flow around the vortex guide element is as unobstructed as possible, so that air from the outer environment can enter the intake duct unhindered through the air inlet opening. This achieves efficient operation of the engine. The engine and in particular the vortex guide element are preferably present as an outer part of the flying body. They thus form an outermost element of the flying body and are accordingly present on its outside. In other words, the engine and in particular also the flying body are bounded by the vortex guide element in the direction of the outer environment, so that the outer environment of the flying body extends directly up to the vortex guide element.

During operation of the engine, air is conveyed from the outer environment through the air inlet opening into the intake duct. It subsequently exits from this through the air outlet opening into the radial duct and flows through this to the air exit gap. The air outlet gap surrounds the vortex guide element annularly, namely preferably in the circumferential direction with respect to the longitudinal central axis of the vortex guide element and/or the longitudinal central axis of the engine completely and continuously. The air exiting the air exit gap, as seen in section, continues to flow along the vortex guide element or an outer contour of the vortex guide element, namely at least in part due to the Coandă effect.

It can be provided that the air, seen in section, flows along the vortex guide element up to the air inlet opening, so that at least part of the air which exits from the air exit gap is conveyed again through the air inlet opening into the intake duct. In any case, the engine is operated in such a way that a flow around the vortex guide element occurs, so that ultimately there is a vortex that surrounds the vortex guide element, which is preferably in the shape of a rotational body, in particular in the shape of a rotational torus. The vortex generated by the engine, which can also be referred to as a supporting vortex, completely surrounds the vortex guide element when viewed in section. It also surrounds the vortex guide element in the circumferential direction, preferably continuously and uninterruptedly. In other words, the supporting vortex envelops the vortex guide element.

The thrust generated by the engine is achieved by different mechanisms of action. On the one hand, there is a higher flow velocity on the side of the air deflecting element facing the vortex guide element, i.e. in the radial duct, than on the side of the vortex guide element facing away from the air deflecting element, i.e. in the outer environment. Due to the different flow velocities, according to Bernoulli's equation, a negative pressure is caused on the side of the vortex guide element facing the air deflecting element compared to the side of the vortex guide element facing away from the air deflecting element. Namely, since the flow velocity of the air on the side facing the air deflecting element is greater than the flow velocity of the air on the side facing away from the air deflecting element, the pressure present on the side facing the air deflecting element is less than that on the side facing the air deflecting element. The pressure difference between the pressures on the opposite sides of the vortex guide element causes part of the thrust generated by the engine.

Another part of the thrust is provided indirectly by the supporting vortex, once it is present. The support vortex conveys air from the outer environment from the side of the air deflecting element facing away from the vortex guide element to the side of the vortex guide element facing away from the air deflecting element. For example, some of the air is forced towards the supporting vortex and onto the side of the vortex guide element facing away from the air deflecting element, i.e. in particular onto the side of the engine facing the ground. This provides thrust which is not directly caused by the flow of the vortex itself, but by the additional air from the outer environment conveyed by the vortex. In principle, it can be stated that the engine provides thrust on the side from which it also draws in air from the outer environment. A thrust jet produced by the engine is accordingly present on the side of the vortex guide element facing away from the air deflecting element. The air inlet opening through which the engine draws in air from the outer environment is also arranged on this side.

It is obvious that the lifting vortex can only be formed when there is sufficient distance between the engine and the ground. In order to use the lift generated by the lifting vortex, it is therefore first necessary to distance the engine or flying body from the ground. This is done, for example, with the aid of a mechanical lifting device that raises the flying body and thus the engine above the ground. Of course, the flying body can also be launched with another engine and only then can the engine be put into operation.

The use of the lifting vortex to at least partially provide the thrust of the engine enables a particularly energy-efficient operation of the engine, because the generation and maintenance of the lifting vortex is possible with a comparatively low energy expenditure, which is significantly lower than the energy expenditure which would be necessary for the direct generation of the thrust. The supporting vortex also results in a particularly high stability of the engine and thus of the flying body in the air, because the supporting vortex takes up a large volume of air or creates a voluminous air cushion for the engine or the flying body. The engine and correspondingly the flying body are almost arbitrarily scalable in terms of load-bearing capacity, because the lifting vortex is also essentially arbitrarily scalable, since it is designed in the manner of a potential vortex.

A further development of the invention provides that the vortex guide element, viewed in section, is bounded on one side by a first profiled surface and on the other side by a second profiled surface, the two profiled surfaces merging directly and continuously on both sides, in particular in an imaginary plane perpendicular to the central axis. The first profiled surface and the second profiled surface are present on opposite sides of an imaginary plane which intersects the vortex guide element. This imaginary plane is preferably perpendicular to the longitudinal central axis of the vortex guide element. For example, the imaginary plane passes through the vortex guide element in the axial direction centrally with respect to the longitudinal central axis, thus dividing the vortex guide element into two parts which have the same extension in the axial direction. The two parts of the vortex guide element can be symmetrical to each other with respect to the imaginary plane. The first profiled surface is on the side of the vortex guide element facing away from the air deflecting element and the second profiled surface is on the side of the vortex guide element facing towards the air deflecting element. The two profiled surfaces merge continuously on each side, i.e. without discontinuity or jump. This creates a surface of the vortex guide element over which the air flows with particularly low losses, resulting in high efficiency.

Preferably, it is provided that, seen in section, a radius of curvature of the first profiled surface and/or a radius of curvature of the second profiled surface is/are each continuously of the same sign. The first profiled surface is defined in section by a first profile line and the second profiled surface by a second profile line. The profiled surfaces or the profiled lines each have a radius of curvature which can change over their extension or remain constant. However, it is at least provided that one of the radii of curvature or both radii of curvature are of the same sign throughout, i.e. that the sign of the respective radius of curvature does not change over the extension of the respective profiled surface, but remains the same.

For example, the radius of curvature of the first profiled surface, seen in section, is selected with the same sign over the entire extension of the first profiled surface. Similarly, the radius of curvature of the second profiled surface can additionally or alternatively have the same sign when viewed in section over the entire extension of the second profiled surface. Preferably, the first profiled surface and the second profiled surface have radii of curvature with the same sign. Particularly preferably, the radii of curvature of the first profiled surface and the second profiled surface are also identical, so that the vortex guide element is circular when viewed in section, in particular when viewed in half section. This realises a particularly flow-favourable design of the vortex guide element.

A further development of the invention provides that the vortex guide element is formed as a body of rotation, in particular as a rotation torus. The body of rotation is a body formed by rotation of a closed curve about an axis of rotation. For example, the curve is curved at least in some areas, in particular continuously curved. Preferably, a radius of curvature of the curve has the same sign over the entire curve. It can thus be provided that the radius of curvature is at least zero or at most zero throughout or—if the curve is curved throughout—is greater than zero or less than zero throughout. The torus of rotation is again understood to be a body of rotation created by rotating a circle about an axis of rotation lying in the plane of the circle and not intersecting the circle. The axis of rotation of the body of rotation is in particular the longitudinal central axis of the vortex guide element. The body of rotation is continuous and uninterrupted in the circumferential direction with respect to its axis of rotation. This enables a particularly effective guidance of the supporting vortex with simultaneously extremely low fluidic losses.

A further development of the invention provides that the air exit gap is in flow connection with the air outlet opening via a radial duct, which has a flow cross-section that decreases in the direction of the air exit gap, so that it is designed in the manner of a nozzle. The radial duct is preferably continuous in the circumferential direction with respect to the longitudinal central axis of the engine and—apart from one or more support struts, which are optionally present—uninterrupted. In the radial direction, it extends from the air outlet opening to the air exit gap, so that the air exiting the intake duct through the air outlet opening flows through the radial duct to the air exit gap. The flow cross-section of the radial duct decreases in the direction of the air exit gap. The shape of the radial duct is chosen in particular so that the air in the air exit gap has a desired flow velocity. This flow velocity is preferably in the subsonic range, so that no negative mechanical influences on the engine due to fluidic shocks or the like are to be expected. The design of the radial duct in the manner of a nozzle enables effective operation of the engine.

A further development of the invention provides that the air deflecting element overlaps the vortex guide element in such a way that the air in the radial duct, at least partially starting from the air outlet opening up to the air inlet opening, rests against the vortex guide element in a fluidically detached manner. It has already been pointed out that the engine is operated in such a way that the supporting vortex surrounds the vortex guide element. In order to achieve a particularly low-loss flow around the vortex guide element, a detachment of the flow or the supporting vortex from the vortex guide element should be avoided as far as possible, in particular completely. For this purpose, the air deflecting element engages around the vortex guide element. The extent of the overlap is selected in such a way that the detachment-free flow around the vortex guide element is achieved by the air exiting from the air outlet opening. At least a part of the air exiting from the air outlet opening and subsequently from the air exit gap should rest against the vortex guide element in such a way that it flows again to the air inlet opening and is conveyed through it again into the intake duct. This enables the already explained high efficiency of the engine, which is realised by the low-loss generation of the supporting vortex.

A further development of the invention provides that the air deflecting element completely overlaps the vortex guide element in the radial direction, in particular in such a way that the air exit gap has a surface normal which runs parallel to the longitudinal central axis of the engine, or that the surface normal intersects the longitudinal central axis of the vortex guide element below the vortex guide element. In the radially outward direction, the air deflecting element thus projects beyond the vortex guide element. The air exit gap defined by the air deflecting element and the vortex guide element is continuously intersected centrally by an imaginary plane in the circumferential direction or lies entirely in this imaginary plane. The imaginary plane is perpendicular to the longitudinal central axis of the vortex guide element and/or the longitudinal central axis of the air deflecting element.

The air exit gap has a surface normal which is, for example, parallel to the longitudinal central axis of the engine. In this case, the air exit gap lies entirely in the imaginary plane. However, it can also be provided that the surface normal intersects the longitudinal central axis of the vortex guide element below the vortex guide element. In this case, the imaginary plane intersects the air exit gap at a certain angle. Such an extensive overlap reliably prevents the air from detaching from the vortex guide element even outside the radial duct, so that at least part of the air exiting through the air exit gap flows up to the air inlet opening and is again conveyed through it into the intake duct.

A further development of the invention provides that the air deflecting element has a projection which engages in the intake duct and to which a drive device for driving the air conveying device is attached. The projection extends from a base element of the air deflecting element into the intake duct. For example, the base element is outside the intake duct so that only the projection projects into the intake duct. The projection is preferably rotationally symmetrical with respect to the longitudinal central axis of the air deflecting element. Additionally or alternatively, a longitudinal central axis of the projection corresponds to the longitudinal central axis of the vortex guide element. This reduces flow resistance caused by the projection as much as possible. The projection is attached to the drive device, which is used to drive the air conveying device. For example, the air conveying device, such as a propeller, a compressor impeller or the like, is rotatably mounted on the projection. This achieves a particularly compact design of the engine.

A further development of the invention provides that an air deflection surface of the air deflecting element bounding the radial duct and facing the vortex guide element is continuously curved when viewed in section, in particular continuously has a radius of curvature which lies in a specific radius of curvature range. The air deflection surface, viewed in the radial direction, extends outwards from the air outlet opening to the air exit gap. It limits the radial duct in the axial direction away from the vortex guide element.

In order to realise particularly low fluidic losses within the radial duct, the air deflection surface is continuously curved. In this case, it has a radius of curvature which can be constant over its extension from the air outlet opening to the air exit gap. However, it can also be provided that the radius of curvature changes over the extension of the air deflection surface in the radial direction outwards. Preferably, however, it always remains within the range of the radius of curvature. In particular, the radius of curvature is selected such that it changes by at most 10%, at most 5%, at most 2.5% or at most 1% over the entire extension of the air deflection surface in the radial direction from the inside to the outside. If the radius of curvature remains constant, the air deflection surface has the shape of a partial circle when viewed in section. This enables the realisation of particularly low flow losses.

A further development of the invention provides that, seen in section, the radius of curvature of the air deflection surface is larger than a radius of curvature of an air guide surface of the vortex guide element bounding the radial duct. Seen in section, the radial duct is thus bounded on the one hand by the air deflection surface of the air deflecting element and on the other hand by the air guide surface of the vortex guide element. The air guiding surface forms the second profiled surface at least in some areas. For the radius of curvature of the air deflection surface, the same applies as for the radius of curvature of the air deflection surface. Preferably, the radius of curvature is constant over the entire extension of the air deflection surface, namely starting from the air outlet opening up to the air exit gap. Here, the radius of curvature of the air deflection surface is greater than the radius of curvature of the air guide surface. The side of the vortex guide element facing the air deflecting element can also be circular in section. This also serves to realise low flow losses.

A further development of the invention provides that the radius of curvature of the air deflection surface and the radius of curvature of the air guide surface are selected in such a way that the flow cross-section of the radial duct is continuously reduced from the air outlet opening to the air exit gap. The different selection of the radii of curvature thus realises the nozzle-like shape of the radial duct in a structurally simple manner.

A further development of the invention provides that the vortex guide element is displaceable with respect to the air deflecting element for global and/or local modification of a flow cross-section of the air exit gap, in particular for adjusting a thrust vector of the engine. Consequently, the air deflecting element is displaceable with respect to the vortex guide element in such a way, in particular by means of a control drive, that the size of the air exit gap is changed, namely either globally and/or locally in the circumferential direction. The global change of the air exit gap or the flow cross-sectional area of the air exit gap means that the size of the air exit gap or the flow cross-sectional area is changed uniformly over the entire extension of the air exit gap, i.e. is enlarged or reduced. The local change, on the other hand, means that the air exit gap or the cross-sectional area of the flow is only increased or decreased in certain areas. For example, for the local change, the air deflecting element is displaced in such a way that the air exit gap is enlarged in some areas and reduced in others. By changing the cross-sectional area of the air exit gap, the thrust vector can be controlled in a simple manner.

A further development of the invention provides that the distance between the air deflecting element and the vortex guide element can be varied uniformly in order to globally change the cross-sectional area of the air exit gap. The uniform change is to be understood as a uniform enlargement or a uniform reduction of the air exit gap. For example, the air deflecting element is displaced parallel to the longitudinal central axis of the vortex guide element, namely to increase the air outlet area away from the vortex guide element and to decrease the flow cross-sectional area towards the vortex guide element. This enables a particularly effective control of the thrust vector by adjusting the vortex intensity of the supporting vortex.

A further development of the invention provides that the air deflecting element can be tilted with respect to the vortex guide element in order to locally change the cross-sectional flow area of the air exit gap. By tilting the air deflecting element, the air exit gap is locally changed, in particular partially enlarged and partially reduced. Tilting takes place, for example, with respect to the longitudinal central axis of the vortex guide element. Preferably, the air deflecting element is designed in such a way that when the air deflecting element is aligned parallel with respect to the longitudinal central axis of the vortex guide element and thus at an angle of 0°, the air exit gap has a constant size throughout in the circumferential direction with respect to the longitudinal central axis. When the angle is changed, however, the local change in the cross-sectional area of the flow occurs. Again, such a design enables a particularly efficient control of the thrust vector.

A further development of the invention provides that control elements are rotatably mounted in the radial duct, each having a control fin. The control elements serve to adjust the thrust vector of the engine, namely by influencing the direction in which the air exits the air exit gap. Each of the control elements has a control fin, which is, for example, plate-like or airfoil-like. In the latter case, the control fin can be symmetrical with regard to its chord or have a fluidic profile. The control elements enable, for example, the generation of a thrust in the circumferential direction, so that the engine or the flying body driven thereby can rotate on the spot about their longitudinal central axis.

A further development of the invention provides that the control elements are drivingly coupled to a control drive of the engine via a common coupling element. The control drive serves to adjust the control elements. It is only indirectly connected to the control elements via the common coupling element. For this purpose, on the one hand the control elements and on the other hand the control drive engage with the coupling element. In particular, the control drive engages the coupling drive at a distance from the control elements. This enables simultaneous adjustment of the control elements by means of the control drive. The air deflecting element can also be additionally or alternatively connected to the coupling element.

A further development of the invention provides that the coupling element is coupled to each of the control elements and/or the control drive via a ball joint and a lever arm. In this respect, each control element and/or the control drive is assigned a ball element and a lever arm, by means of which they are connected to the control drive in terms of drive technology. The use of the ball joint ensures an extremely flexible adjustment of the control elements by means of the control drive.

A further development of the invention provides that the coupling element is designed as a control ring. The control ring preferably surrounds the longitudinal central axis of the engine continuously and completely in the circumferential direction. It engages the control elements in order to couple them to the control drive. The control ring is arranged in such a way that it can not only describe a rotational movement in the circumferential direction with respect to the longitudinal central axis, but that it can also be tilted and is thus in the nature of a swash plate. This enables the aforementioned flexible actuation of the control elements by means of the control drive.

A further development of the invention provides that the control drive has a plurality of actuators, each of which is drive-coupled to the coupling element at a distance from one another. Preferably, the actuators are evenly spaced from each other, so that in the case of two actuators, they engage the coupling element at a distance of 180°, in the case of three actuators at a distance of 120° and in the case of four actuators at a distance of 90°. The use of the multiple actuators enables a displacement of the coupling element not only in the circumferential direction with respect to the longitudinal central axis, but additionally in the radial direction, so that the already described flexible adjustment of the control elements is realised.

A further development of the invention provides that the air deflecting element and/or the vortex guide element comprises a fluid-tight buoyancy chamber filled with a gas having a lower density than air. The vortex guide element and/or the air deflecting element is thus designed as a buoyancy body. With the help of the gas, a lift is generated which is or at least can be decoupled from the actual thrust of the engine. For example, the engine is designed in such a way that a large part of the lift required to lift the flying body is already generated with the help of the gas present in the buoyancy chamber. The remaining lift is provided by the thrust of the engine, for which its thrust vector is adjusted accordingly. The gas used is, for example, helium or similar. The gas enables a particularly energy-efficient operation of the engine or the flying body.

A further development of the invention provides that at least one useful space of the flying body, in particular a passenger compartment and/or a cargo compartment, is arranged in the air deflecting element and/or the vortex guide element (respectively). For this purpose, the air deflecting element and/or the vortex guide element are appropriately dimensioned so that the engine has a corresponding size. In the passenger compartment, for example, at least one passenger seat is arranged, in particular several passenger seats, which are arranged in several rows, for example. The cargo compartment serves to accommodate cargo, in particular luggage and/or goods to be transported. It also has a corresponding size for this purpose. For loading and unloading the useful space, the air deflecting element has at least one reversibly closable access opening, for example in the form of a door, a gate, a hatch or the like.

A fuel tank for holding fuel and/or an energy storage device for temporarily storing electrical energy can also be arranged in the useful space. The fuel and/or the temporarily stored electrical energy preferably serve to operate the drive device. For this purpose, for example, the fuel tank is connected fluidically and/or the energy storage device is connected electrically to the drive device. It can be provided to form a useful space in the vortex guide element as well as in the air deflecting element. For example, the cargo space and/or the fuel tank and/or the energy storage device are arranged in the useful space of the air deflecting element. The useful space of the vortex guide element, on the other hand, serves as passenger space. Preferably, the useful space of the air deflecting element is unpressurised in relation to the outer environment, whereas the useful space of the vortex guide element is pressurised in relation to the outer environment.

Further preferred embodiments of the engine are explained below, the features of which can be used alternatively or additionally. For example, the air deflecting element overlaps the vortex guide element in the radial direction starting from its longitudinal central axis by at least 25%, at least 50%, at least 75% or at least 100%. It may therefore already be sufficient that an overlap of at most 50% is realised, for example by at least 25%, at least 30%, at least 40% or at least 50%. Preferably, however, the overlap is at least 50% or more, in particular at least 60% or at least 75%. The overreach can also be over at least 80%, at least 90% or at least 100%. In the latter case, the air deflecting element overlaps the vortex guide element completely, in particular exactly completely, as seen in the radial direction, i.e. it does not protrude beyond the vortex guide element so that it is flush with it radially on the outside. However, it can also be provided that the air deflecting element extends beyond the vortex guide element in the radial direction, i.e. is larger than the latter in the radial direction. For example, the air deflecting element has dimensions in the radial direction that are larger than dimensions of the vortex guide element in the same direction. In particular, the dimensions of the air deflecting element in the radial direction are at least 105% or at least 110% of the dimensions of the vortex guide element.

Particularly preferably, however, the air deflecting element is as small as possible in the radial direction in order to avoid flow losses. The extent of the overlap is preferably selected in such a way that just the detachment-free flow around the vortex guide element by the air exiting from the air outlet opening is achieved and ideally is not greater. At least part of the air exiting from the air outlet opening and subsequently from the air exit gap should rest against the vortex guide element in such a way that it flows again to the air inlet opening and is conveyed through it again into the intake duct. For example, it is sufficient for the air deflecting element to overlap the vortex guide element in the radial direction by at most 90%, at most 80% or at most 70%.

The air deflecting element has, for example, a volume which at least corresponds to a volume of the vortex guide element. Preferably, the volume of the air deflecting element is larger than the volume of the vortex guide element, in particular it is larger by a factor of at least 1.25, at least 1.5, at least 1.75 or at least 2. Thus, the air deflecting element is preferably available to accommodate a useful space of the flying body. The useful space may, for example, comprise or exist as a passenger compartment and/or a cargo compartment. However, it may also be provided that the volume of the air deflecting element is at most equal to or less than the volume of the vortex guide element. For example, the volume of the air deflecting element is at most 75%, for example at most 70%, at most 60% or at most 50%, of the volume of the vortex guide element. In such an embodiment, it may be provided that the useful space is arranged in the vortex guide element.

It may be provided that the air deflecting element has an extension in the axial direction which corresponds at least to an extension of the vortex guide element in the same direction. Preferably, the extension of the air deflecting element in the axial direction is greater than that of the vortex guide element, in particular by a factor of at least 1.25, at least 1.5, at least 1.75 or at least 2. In this way, the large volume of the air deflecting element already described above can be realised in a simple manner, so that, for example, the useful space is designed to be spacious. The invention further relates to a method for operating an engine for a flying body, in particular an engine according to the embodiments within the scope of this description, wherein the engine has an annular vortex guide element which, viewed in section, has an air inlet opening arranged centrally with respect to a longitudinal central axis of the engine and, at a distance from the air inlet opening, an air outlet opening arranged centrally with respect to the longitudinal central axis, which are connected to one another in terms of flow via an intake duct which is bounded by the vortex guide element and receives an air conveying device, the air outlet opening being overlapped by an air deflecting element which is arranged geodetically above the vortex guide element when the engine is operating as intended and which extends radially outwards from the air outlet opening, so that it bounds with the vortex guide element an air exit gap which is in flow connection with the air outlet opening.

In this case, it is provided that the vortex guide element is in the form of a body of rotation which is formed by rotation about an axis of rotation of a closed curve having a continuous course at least on its radially outer side, and that the air inlet opening opens directly into an outer environment of the engine so that, when the engine is operating as intended, air is conveyed through the air inlet opening into the intake duct from the side of the engine facing away from the air deflecting element.

The advantages of such a design of the engine or such a procedure have already been pointed out. Both the engine and the method for operating it can be further developed in accordance with the explanations in this description, so that reference is made to this in this respect.

As already explained, the engine is operated in such a way that the supporting vortex forms around the vortex guide element. This vortex also draws air from the outer environment and transports it under the engine, where it is used to provide thrust. The supporting vortex thus ultimately serves as a means of transporting air from the outer environment, which is sucked in from the side of the air deflecting element facing away from the vortex guide element and/or from the vicinity of the vortex guide element and is at least temporarily fed to the supporting vortex.

The air exiting the air exit gap as well as the air from the outer environment entering the supporting vortex are conveyed by the supporting vortex to the side of the vortex guide element facing away from the air deflecting element, namely partly as far as the longitudinal central axis. From there, part of the air is conveyed through the air inlet opening into the intake duct, whereas another part of the air is deflected in the direction of the vortex guide element facing away from the air deflector element to generate a thrust jet of the engine and thus the thrust of the engine. Thus, part of the air conveyed by the supporting vortex in the direction of the longitudinal central axis is deflected in the direction of the vortex guide element and another part is deflected in the direction away from the vortex guide element.

The invention also relates to a flying body with at least one engine, in particular an engine according to the embodiments within the scope of this description, wherein the engine has an annular vortex guide element which, viewed in section, has an air inlet opening arranged centrally with respect to a longitudinal central axis of the engine and, at a distance from the air inlet opening, an air outlet opening arranged centrally with respect to the longitudinal central axis, which are connected to one another in terms of flow via an intake duct which is bounded by the vortex guide element and accommodates an air conveying device, the air outlet opening being overlapped by an air deflecting element which is arranged geodetically above the vortex guide element when the engine is operating as intended and which extends radially outwards from the air outlet opening, so that it bounds with the vortex guide element an air exit gap which is in flow connection with the air outlet opening.

It is provided that the vortex guide element is in the form of a body of rotation which is formed by rotation about an axis of rotation of a closed curve which has a continuous course at least on its radially outer side, and that the air inlet opening opens directly into an outer environment of the flying body so that, when the engine is operating as intended, air is conveyed from the side of the engine facing away from the air deflecting element through the air inlet opening into the intake duct.

Once again, reference is made to the further explanations within the scope of this description with regard to the advantages and possible advantageous further developments.

A further development of the invention provides that the flying body is designed as an aircraft or as a motor vehicle capable of flight. In the case of the design as an aircraft, a useful space of the aircraft, for example a passenger compartment or cargo compartment, is preferably located in the air deflecting element. In this case, the engine forms the flying body or, in other words, the flying body consists entirely or at least substantially entirely of the engine. Of course, the flying body can also have several engines that are arranged at a distance from each other. If, on the other hand, the flying body is designed as a flying motor vehicle, it preferably comprises several engines.

These are arranged at a distance from each other on the motor vehicle in order to temporarily lift it off the ground.

The invention is explained in more detail below with reference to the embodiments shown in the drawing, without any limitation of the invention.

The single FIGURE shows a schematic representation of a flying body with an engine.

The FIGURE shows a schematic longitudinal sectional view of a flying body 1 with an engine 2 for providing propulsion for the flying body 1. In the embodiment example shown here, the flying body 1 essentially consists of the engine 2. Of course, the flying body can also have several engines 2, which in this case are connected to each other via a common structure.

The engine 2 has an annular vortex guide element 3. In the embodiment example shown here, the vortex guide element 3 is designed as a body of rotation, in particular as a rotation torus, with respect to a longitudinal central axis 4 of the vortex guide element 3. The longitudinal central axis 4 is also the longitudinal central axis of the flying body 1. The vortex guide element 3 continuously and completely surrounds an intake duct 5 with an air inlet opening 6 and an air outlet opening 7 in the circumferential direction. An air conveying device 8 is arranged in the intake duct 5, which is designed, for example, as a propeller and can be driven by means of a drive device not shown here. Both the air inlet opening 6 and the air outlet opening 7 are arranged centrally with respect to the longitudinal central axis 4. In this respect, they are coaxial to each other.

The vortex guide element 3 is at least partially overlapped by an air deflecting element 9. The air deflecting element 9 also has a longitudinal central axis, which in the example shown here coincides with the longitudinal central axis 4. The air deflecting element 9 is arranged centrally with respect to the vortex guide element 3 and in this respect overlaps at least the air outlet opening 7, namely completely in the radial direction. Shown is an example of the flying body 1 or the engine 2 in which the air deflecting element 9 extends in the radial direction beyond the vortex guide element 3. In other words, the air deflecting element 9 completely overlaps the vortex guide element 3, seen in section, and projects outwards beyond it in the radial direction.

The vortex guide element 3 and the air deflecting element 9 together delimit a radial duct 10, which on the one hand starts from the air outlet opening 7 and on the other hand extends to an air exit gap 11. It can be seen that the radial duct 10 in the embodiment example shown here continuously decreases in size starting from the air outlet opening 7 up to the air exit gap 11, i.e. has a flow cross-section that decreases. For this purpose, an air deflecting surface 12 of the air deflecting element 9 continuously approaches an air guide surface 13 of the vortex guide element 3 in the radial outward direction.

The vortex guide element 3 is intersected centrally in the axial direction with respect to the longitudinal central axis 4 by an imaginary plane 14 which, viewed in section, divides the vortex guide element 3 into a first profiled surface 15 and a second profiled surface 16. The first profiled surface 15 is located on a side of the air deflecting element 3 facing away from the air deflecting element 9, whereas the second profiled surface 16 is located on a side of the vortex guide element 3 facing towards the air deflecting element 9. It can be seen that the air conveying device 8 is also arranged approximately centrally in the intake duct 5 in the axial direction, so that the imaginary plane 14 intersects the air conveying device 8. The air conveying device 8 is mounted on a projection 17 which extends from a base body 18 of the air deflecting element 9. The projection 17 extends through the air outlet opening 7 into the intake duct 5.

It is provided that the engine 2 is operated in such a way that air is conveyed from an outer environment 19 through the air inlet opening 6 into the intake duct 5. Subsequently, the air is conveyed from the intake duct 5 via the air outlet opening 7 into the radial duct 10, from which it finally exits again through the air exit gap 11 into the outer environment 19. The air is deflected by at least 90°, at least 135°, at least 150°, at least 165° or at least 180°. In the embodiment example shown here, the air is deflected by almost 180° after it enters the intake duct 5 through the air inlet opening 6 until it exits the radial duct 10 through the air exit gap 11. The air is thus expelled from the engine 2 in the opposite direction to that in which it entered it.

Incidentally, this applies to the entire flying body 1, the lowest part of which is formed by the engine 2. This means that no other element of the flying body 1 and/or the engine 2 is arranged on the side of the vortex guide element 3 facing away from the air deflecting element 9. The air inlet opening 6 is insofar designed without overlap, so that a free air space arranged below the air inlet opening 6 is present in the outer environment 19 or forms a part of the outer environment 19. The free air space below the air inlet opening 6 is completely filled with air. In other words, there is no further element of the flying body 1 and/or the engine 2 between the vortex guide element 3 and a floor 20 above which the flying body 1 is located, so that the flying body 1 and/or the engine 2 is designed to be free of obstructions or blockages.

By conveying the air into the intake duct 5 through the air inlet opening 6 and discharging the air through the air exit gap 11, a supporting vortex 21 is generated which, seen in section, surrounds the vortex guide element 3. Like the vortex guide element 3, the supporting vortex 21 is toroidal, in particular rotationally toroidal. The thrust of the engine 2 is now achieved on the one hand by a higher flow velocity of the air in the radial duct 10 compared with a flow velocity of the air outside the radial duct 10 or on the side of the vortex guide element 3 opposite the radial duct 10.

A further part of the thrust is provided at least temporarily by means of the supporting vortex 21. The supporting vortex conveys air from the outer environment 19 along the streamlines 22 shown here purely as an example to the side of the vortex guide element 3 facing away from the air deflecting element 9. In particular, air is also sucked in from the side of the air deflecting element 9 facing away from the vortex guide element 3 and conveyed to the opposite side of the engine 2 in accordance with the streamlines 22. This forms a thrust jet 23 on the side of the vortex guide element 3 facing away from the air deflecting element 9, which causes the aforementioned part of the thrust. The supporting vortex 21 thus functions as an air conveying device, which significantly increases the efficiency of the air conveying device 8.

In the arrangement of vortex guide element 3 and air deflecting element 9 shown here with respect to each other, a thrust vector of the engine 2 is aligned parallel to the longitudinal central axis 4. In order to tilt the thrust vector and in this respect enable control of the flying body 1, the vortex guide element 3 and the air deflecting element 9 are displaceable relative to each other, namely in such a way that the air exit gap 11 is variable in size, in particular locally variable. This means that either the size of the air exit gap 11 is changed uniformly over the circumference of the engine 2, or unevenly. For example, the air exit gap 11 is enlarged on one side of the engine 2 and reduced on the opposite side, so that different flow velocities of the air flowing out of the air exit gap 11 result.

The flying body 1 described has the advantage of being extremely energy efficient due to the use of the lifting vortex 21 to provide at least part of the thrust. In addition, it is possible to control the flying body 1 extremely precisely by means of the displacement of vortex guide element 3 and air deflecting element 9 with respect to each other. In particular, the flying body 1 can hover in the air analogous to a helicopter. Nevertheless, it can achieve quite high speeds because, unlike the helicopter, it is not limited by a maximum flow speed at the blade tips of a rotor.

The invention claimed is:

1. An engine for an flying body, with an annular vortex guide element which, in a longitudinal section with respect to a longitudinal central axis of the engine, has an air inlet opening arranged centrally with respect to the longitudinal central axis and, at a distance from the air inlet opening, an air outlet opening arranged centrally with respect to the longitudinal central axis, which are connected to one another in terms of flow via an intake duct which is bounded by the vortex guide element and accommodates an air conveying device, the air outlet opening being overlapped by an air deflecting element which is arranged geodetically above the vortex guide element when the engine is operating as intended, which extends radially outwards from the air outlet opening so that, together with the vortex guide element, the air deflecting element delimits an air exit gap which is in flow communication with the air outlet opening, wherein the vortex guide element is in the form of a body of rotation which is formed by rotation about an axis of rotation of a closed curve continuously having a continuous course at least on its radially outer side, and in that the air inlet opening opens directly into an outer environment of the engine, so that there is a free air space in an imaginary extension of the intake duct (5) on the side of the air inlet opening (6) and, when the engine is operating as intended, air is conveyed from the side of the engine facing away from the air deflecting element through the air inlet opening directly from the outer environment (19) into the intake duct.

2. The engine according to claim 1, wherein the vortex guide element, in a longitudinal section, is bounded on one side by a first profiled surface and on the other side by a second profiled surface, the two profiled surfaces merging directly and continuously into one another on both sides.

3. The engine according to claim 1, wherein the air exit gap is in flow connection with the air outlet opening via a radial duct which has a flow cross-section which decreases in the direction of the air exit gap, so that it is designed in the manner of a nozzle.

4. The engine according to claim 1, wherein the air deflecting element completely overlaps the vortex guide element in the radial direction.

5. The engine according to claim 1, wherein the air deflecting element has a projection engaging in the intake duct, to which projection a drive device for driving the air conveying device is attached.

6. The engine according to claim 3, wherein an air deflecting surface of the air deflecting element which bounds the radial duct and faces the vortex guide element is continuously curved when viewed in longitudinal section.

7. The engine according to claim 6, wherein, in longitudinal section, the radius of curvature of the air deflection surface is greater than a radius of curvature of an air guide surface of the vortex guide element bounding the radial duct.

8. The engine according to claim 6, wherein the radius of curvature of the air deflection surface and the radius of curvature of the air exit gap are selected in such a way that the flow cross-section of the radial duct decreases continuously from the air outlet opening to the air exit gap.

9. The engine according to claim 1, wherein the vortex guide element is displaceable with respect to the air deflecting element for globally and/or locally changing a flow cross-section of the air exit gap.

10. The engine according to claim 1, wherein the air deflecting element and/or the vortex guide element comprises a fluid-tight buoyancy chamber filled with a gas having a lower density than air.

11. The engine according to claim 1, wherein at least one useful space of the flying body is arranged in the air deflecting element and/or the vortex guide element.

12. A method for operating an engine for a flying body according to claim 1, wherein the engine has an annular vortex guide element which, in section, has an air inlet opening arranged centrally with respect to a longitudinal central axis of the engine and, at a distance from the air inlet opening, an air outlet opening arranged centrally with respect to the longitudinal central axis, which are connected to one another in terms of flow via an intake duct which is bounded by the vortex guide element and accommodates an air conveying device, the air outlet opening being overlapped by an air deflecting element which is arranged geodetically above the vortex guide element when the engine is operating as intended, which extends radially outwards from the air outlet opening so as to delimit with the vortex guide element an air exit gap which is in flow communication with the air outlet opening, wherein the vortex guide element is in the form of a body of rotation which is formed by rotation about an axis of rotation of a closed curve continuously having a continuous course at least on its radially outer side, and in that the air inlet opening opens directly into an outer environment of the engine, so that there is a free air space in an imaginary extension of the intake duct (5) on the side of the air inlet opening (6) and, when the engine is operating as intended, air is conveyed from the side of the engine facing away from the air deflecting element through the air inlet opening directly from the outer environment (19) into the intake duct wherein the engine is operated in such a way that a supporting vortex forms around the vortex guide element.

13. A flying body with at least one engine according to claim 1.

14. The flying body according to claim 13, wherein the flying body is designed as an aircraft or as a motor vehicle capable of flight.

\* \* \* \* \*